(12) United States Patent
Kim

(10) Patent No.: US 10,601,482 B2
(45) Date of Patent: Mar. 24, 2020

(54) METHOD FOR REPORTING CHANNEL STATE INFORMATION FOR MUST TRANSMISSION IN WIRELESS COMMUNICATION SYSTEM AND DEVICE THEREFOR

(71) Applicant: LG ELECTRONICS INC., Seoul (KR)

(72) Inventor: Hyungtae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/067,499

(22) PCT Filed: Jan. 5, 2017

(86) PCT No.: PCT/KR2017/000147
§ 371 (c)(1),
(2) Date: Jun. 29, 2018

(87) PCT Pub. No.: WO2017/122965
PCT Pub. Date: Jul. 20, 2017

(65) Prior Publication Data
US 2019/0013855 A1    Jan. 10, 2019

Related U.S. Application Data

(60) Provisional application No. 62/277,971, filed on Jan. 13, 2016, provisional application No. 62/279,807, filed on Jan. 17, 2016.

(51) Int. Cl.
*H04B 7/06* (2006.01)
*H04W 76/27* (2018.01)
(Continued)

(52) U.S. Cl.
CPC ......... *H04B 7/0626* (2013.01); *H04B 7/0452* (2013.01); *H04B 7/0456* (2013.01);
(Continued)

(58) Field of Classification Search
CPC ........ H04B 7/0626; H04B 76/27; H04B 7/04; H04B 7/0452; H04B 7/0456; H04B 7/06; H04B 7/0632; H04B 7/0639; H04W 24/10
See application file for complete search history.

(56) References Cited

U.S. PATENT DOCUMENTS

2009/0207784 A1    8/2009    Lee et al.
2011/0235533 A1    9/2011    Breit et al.
(Continued)

FOREIGN PATENT DOCUMENTS

WO    WO 2008/137320 A1    11/2008

OTHER PUBLICATIONS

Intel Corporation, "CSI Enhancement to Support Multi-User Superposition Transmission", 3GPP TSG RAN WG1 Meeting #83, R1-156534, Anaheim, USA, Nov. 15-22, 2015, pp. 1-3 (4 pages total).

*Primary Examiner* — Shukri Taha
(74) *Attorney, Agent, or Firm* — Birch, Stewart, Kolasch & Birch, LLP

(57) ABSTRACT

Disclosed in the present application is a method by which a terminal reports channel state information (CSI) to a base station in a wireless communication system. Specifically, the method comprises the steps of: calculating a first CSI as to compare the same with CSI which has been most recently reported; reporting the first CSI to a base station if the calculated first CSI is not the same as the CSI which has been most recently reported; and reporting a second CSI to the base station if the calculated first CSI is the same as the
(Continued)

CSI which has been most recently reported, wherein the second CSI is CSI calculated on the basis of the assumption that interference affecting a terminal has been removed.

8 Claims, 10 Drawing Sheets

(51) Int. Cl.
  *H04B 7/0452* (2017.01)
  *H04B 7/0456* (2017.01)
(52) U.S. Cl.
  CPC ......... *H04B 7/0632* (2013.01); *H04B 7/0639* (2013.01); *H04W 76/27* (2018.02)

(56) References Cited

U.S. PATENT DOCUMENTS

| | | | |
|---|---|---|---|
| 2012/0328035 A1 | 12/2012 | Yoon et al. | |
| 2016/0373195 A1* | 12/2016 | Kato | H04W 16/32 |
| 2016/0380734 A1* | 12/2016 | Wang | H04L 5/0057 |
| | | | 370/329 |
| 2017/0150388 A1* | 5/2017 | Wen | H04L 5/00 |
| 2018/0220399 A1* | 8/2018 | Davydov | H04L 1/0026 |

* cited by examiner

FIG. 2
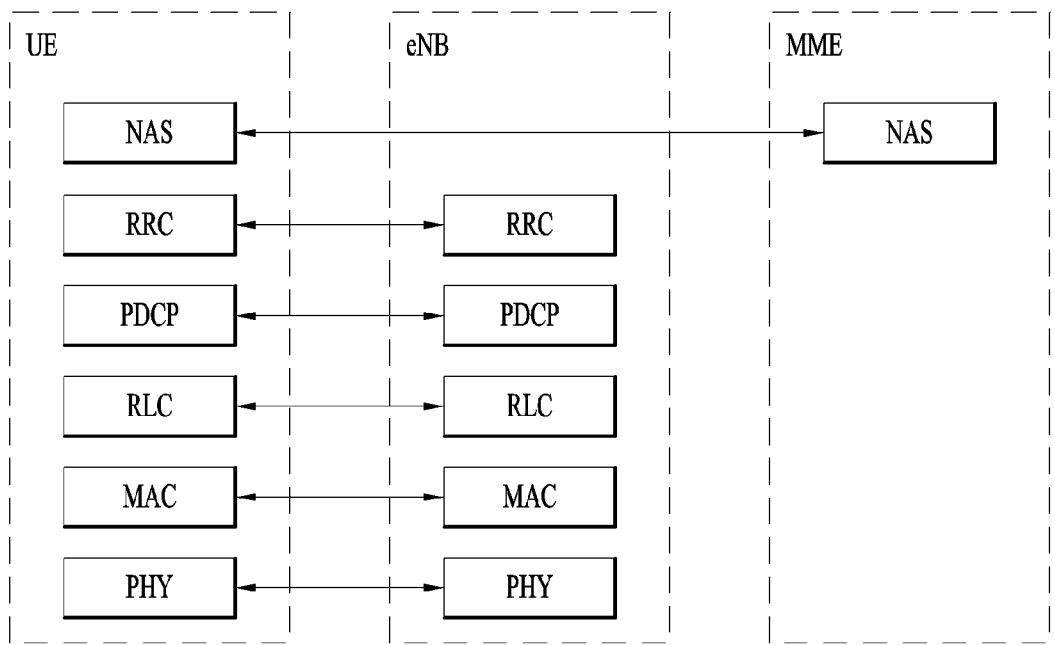
(a) Control-Plane Protocol Stack
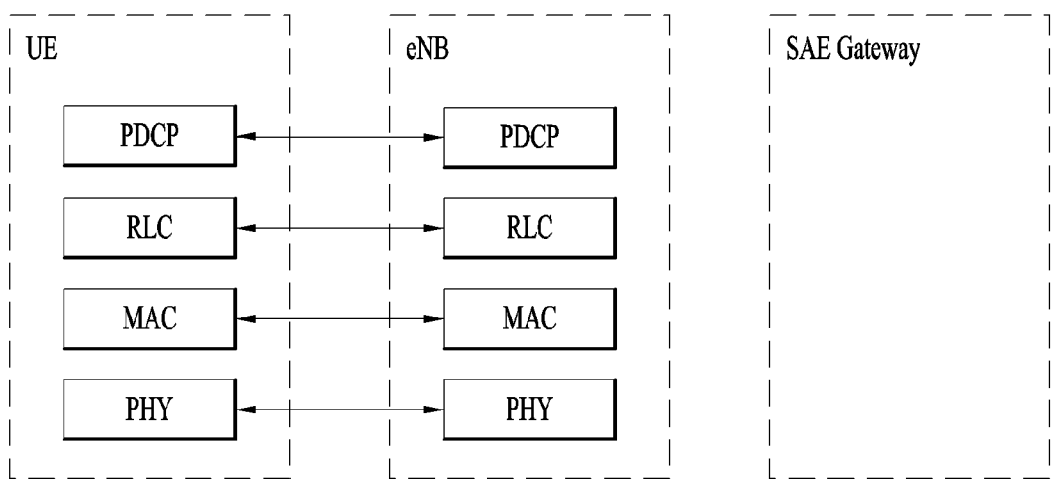
(b) User-Plane Protocol Stack

METHOD FOR REPORTING CHANNEL STATE INFORMATION FOR MUST TRANSMISSION IN WIRELESS COMMUNICATION SYSTEM AND DEVICE THEREFOR

CROSS REFERENCE TO RELATED APPLICATIONS

This application is the National Phase of PCT International Application No. PCT/KR2017/000147, filed on Jan. 5, 2017, which claims priority under 35 U.S.C. 119(e) to U.S. Provisional Application Nos. 62/277,971, filed on Jan. 13, 2016 and 62/279,807, filed on Jan. 17, 2016, all of which are hereby expressly incorporated by reference into the present application.

TECHNICAL FIELD

The present invention relates to a wireless communication system, and more particularly, to a method for reporting channel state information for MUST (Multi-User Superposition Transmission) in a wireless communication system and a device therefor.

BACKGROUND ART

As an example of a mobile communication system to which the present invention is applicable, a 3rd generation partnership project long term evolution (hereinafter, referred to as LTE) communication system is described in brief.

FIG. 1 is a diagram schematically illustrating a network structure of an E-UMTS as an exemplary radio communication system. An evolved universal mobile telecommunications system (E-UMTS) is an advanced version of a legacy universal mobile telecommunications system (UMTS) and basic standardization thereof is currently underway in 3GPP. E-UMTS may be generally referred to as an LTE system. For details of the technical specifications of UMTS and E-UMTS, reference can be made to Release 7 and Release 8 of "3rd Generation Partnership Project; Technical Specification Group Radio Access Network".

Referring to FIG. 1, the E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.25, 2.5, 5, 10, 15, and 20 MHz to provide a downlink or uplink transmission service to multiple UEs. Different cells may be configured to provide different bandwidths. The eNB controls data transmission and reception to and from a plurality of UEs. Regarding downlink (DL) data, the eNB transmits DL scheduling information to notify a corresponding UE of a time/frequency domain within which data is to be transmitted, coding, data size, and hybrid automatic repeat and request (HARQ)-related information by transmitting DL scheduling information to the UE. In addition, regarding uplink (UL) data, the eNB transmits UL scheduling information to a corresponding UE to inform the UE of an available time/frequency domain, coding, data size, and HARQ-related information. An interface for transmitting user traffic or control traffic between eNBs may be used. A core network (CN) may include the AG and a network node for user registration of the UE. The AG manages mobility of a UE on a tracking area (TA) basis, each TA including a plurality of cells.

Although radio communication technology has been developed up to LTE based on wideband code division multiple access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, a simplified structure, an open interface, appropriate power consumption of a UE, etc. are required.

DISCLOSURE

Technical Problem

Based on the aforementioned discussion, an object of the present invention is to provide a method for reporting channel state information for MUST (Multi-User Superposition Transmission) in a wireless communication system and a device therefor.

Technical Solution

According to one aspect of the present invention, a method for reporting channel state information (CSI) from a user equipment (UE) to a base station in a wireless communication system comprises the steps of: calculating first CSI and comparing the calculated first CSI with CSI which has been most recently reported; reporting the first CSI to the base station if the calculated first CSI is not the same as the CSI which has been most recently reported; and reporting second CSI to the base station if the calculated first CSI is the same as the CSI which has been most recently reported, wherein the second CSI is CSI calculated on the basis of the assumption that interference affecting the UE has been canceled.

According to one aspect of the present invention, a UE in a wireless communication system comprises a radio frequency (RF) module; and a processor calculating first CSI and comparing the calculated first CSI with CSI which has been most recently reported, reporting the first CSI to a base station if the calculated first CSI is not the same as the CSI which has been most recently reported, and reporting second CSI to the base station if the calculated first CSI is the same as the CSI which has been most recently reported, wherein the second CSI is CSI calculated on the basis of the assumption that interference affecting the UE has been canceled.

Preferably, the second CSI may include a predetermined indicator for identification from the first CSI.

Preferably, the calculated first CSI is compared with the CSI which has been most recently reported if a strength of a reference signal received from the base station is a threshold value or more.

Preferably, the first CSI may include PMI (Precoding Matrix Index) and CQI (Channel Quality Indicator), and it is determined whether at least one of PMI and CQI included in the first CSI is the same as PMI and CQI included in the CSI which has been most recently reported. In this case, the second CSI includes the PMI and the CQI if a rank indicator of the CSI which has been most recently reported is 1. On the other hand, the second CSI may include only the CQI if a rank indicator of the CSI which has been most recently reported is 2.

The first CSI and the second CSI may be reported to the base station if the calculated first CSI is the same as the CSI which has been most recently reported.

Advantageous Effects

According to the embodiment of the present invention, channel state information may efficiently be reported for MUST in a wireless communication system.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

FIG. 2 is a diagram illustrating structures of a control plane and a user plane of a radio interface protocol between a UE and an evolved UMTS terrestrial radio access network (E-UTRAN) based on the 3GPP radio access network specification;

BEST MODE FOR CARRYING OUT THE INVENTION

Figure 1:
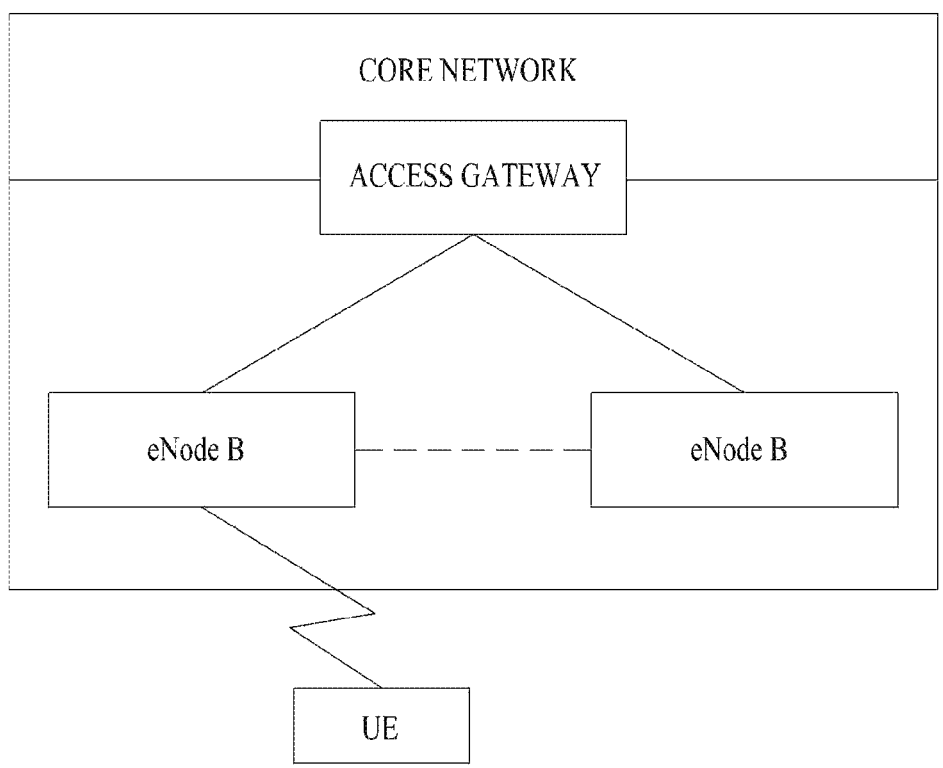
FIG. 1 is a diagram schematically illustrating a network structure of an evolved universal mobile telecommunications system (E-UMTS) as an exemplary radio communication system.

Hereinafter, structures, operations, and other features of the present invention will be readily understood from the embodiments of the present invention, examples of which are illustrated in the accompanying drawings. Embodiments which will be described hereinbelow are examples in which technical features of the present invention are applied to a 3GPP system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. In addition, although the embodiments of the present invention will be described based on frequency division duplexing (FDD), the FDD mode is purely exemplary and the embodiments of the present invention can easily be applied to half-FDD (H-FDD) or time division duplexing (TDD) with some modifications.

In the present disclosure, a base station (eNB) may be used as a broad meaning including a remote radio head (RRH), an eNB, a transmission point (TP), a reception point (RP), a relay, etc.

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel. Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

A single cell managed by an eNB is configured to operate in one of the bandwidths of 1.25, 2.5, 5, 10, 15 and 20 Mhz and provide downlink (DL) or uplink (UL) transmission service to a plurality of UEs in the bandwidth. Different cells may be configured so as to provide different bandwidths.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
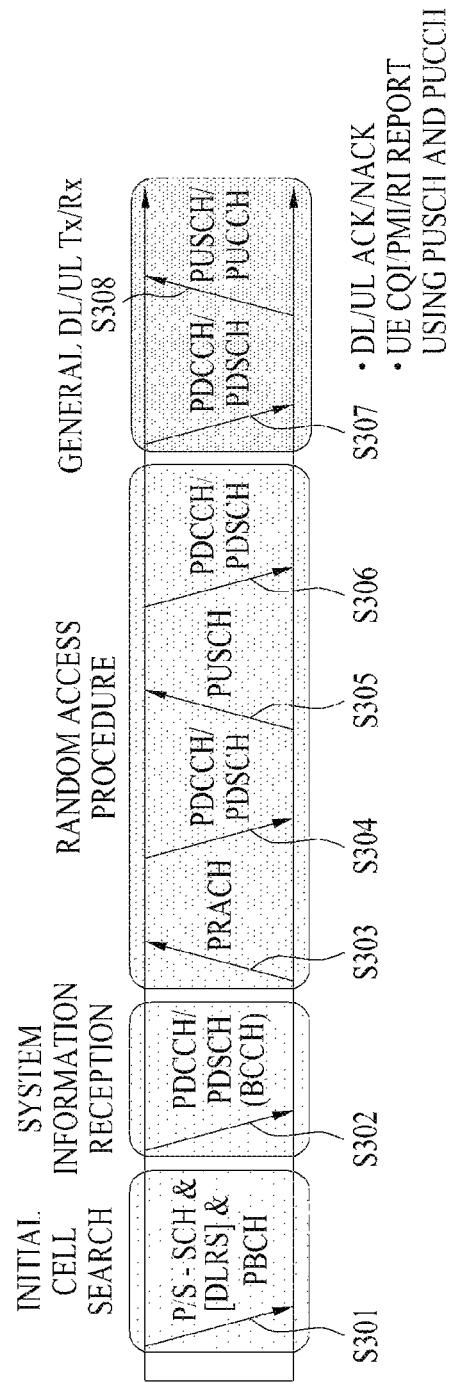
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 4:
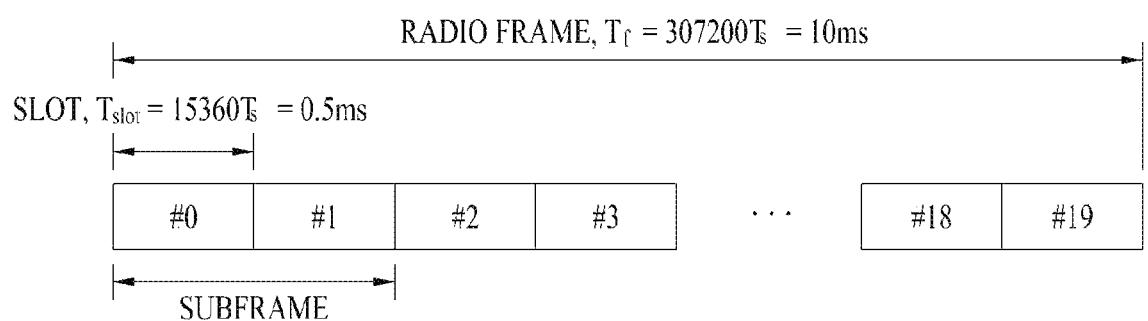
FIG. 4 is a diagram illustrating the structure of a radio frame used in a long term evolution (LTE) system.

FIG. 4 is a diagram illustrating the structure of a radio frame used in an LTE system.

Referring to FIG. 4, the radio frame has a length of 10 ms (327200×Ts) and includes 10 equal-sized subframes. Each of the subframes has a length of 1 ms and includes two slots. Each slot has a length of 0.5 ms (15360 Ts). In this case, Ts denotes a sampling time represented by $Ts=1/(15 \text{ kHz} \times 2048)=3.2552 \times 10^{-8}$ (about 33 ns). Each slot includes a plurality of OFDM symbols in the time domain and includes a plurality of resource blocks (RBs) in the frequency domain. In the LTE system, one RB includes 12 subcarriers×7 (or 6) OFDM symbols. A transmission time interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
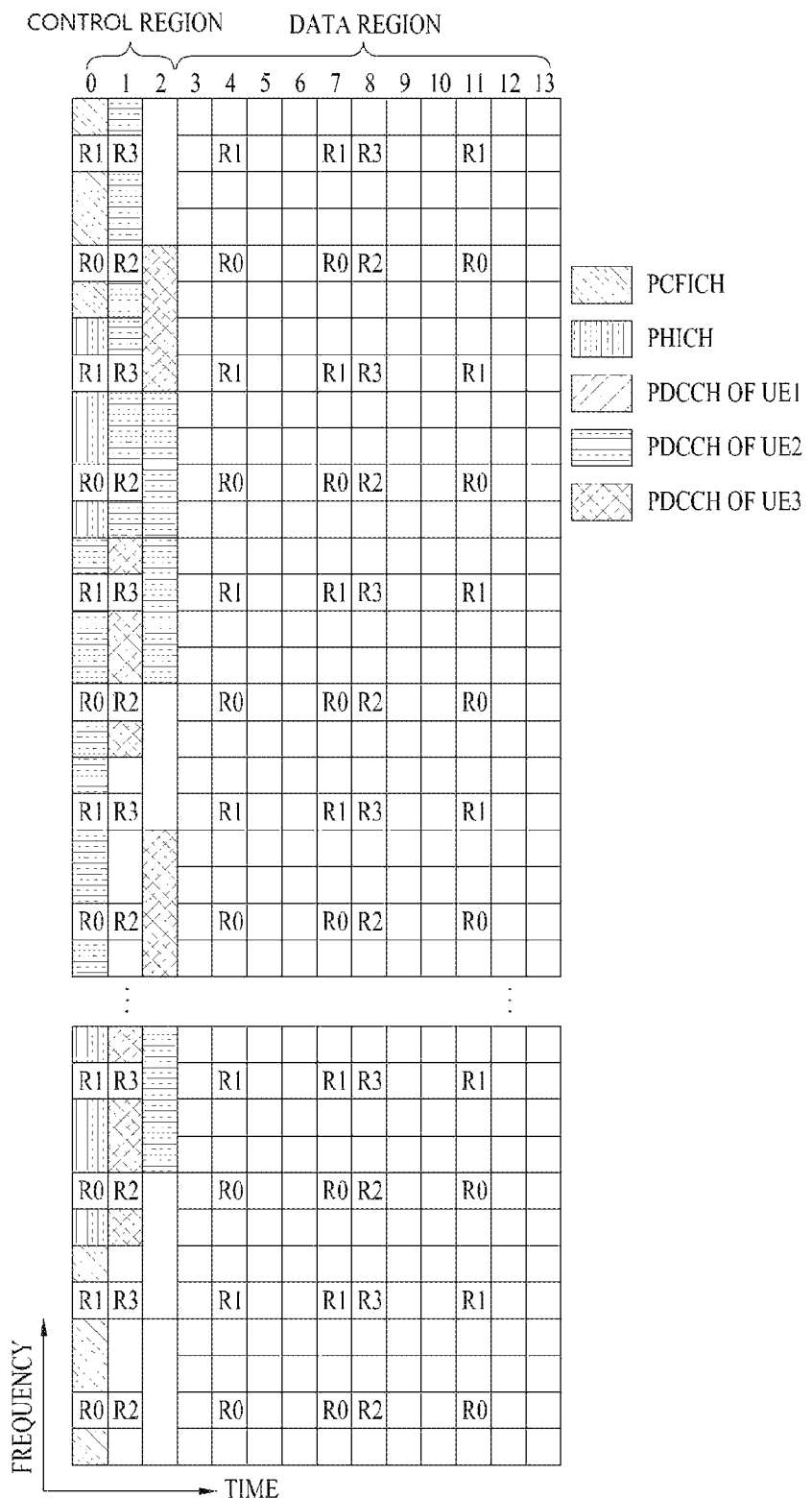
FIG. 5 is a diagram illustrating the structure of a DL radio frame used in an LTE system.

FIG. 5 is a diagram illustrating control channels contained in a control region of one subframe in a DL radio frame.

Referring to FIG. 5, one subframe includes 14 OFDM symbols. The first to third ones of the 14 OFDM symbols may be used as a control region and the remaining 11 to 13 OFDM symbols may be used as a data region, according to subframe configuration. In FIGS. 5, R1 to R4 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Further, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe.

Hereinafter, a MIMO system will be described. MIMO refers to a method using multiple transmit antennas and multiple receive antennas to improve data transmission/reception efficiency. Namely, a plurality of antennas is used at a transmitter or a receiver of a wireless communication system so that capacity can be increased and performance can be improved. MIMO may also be referred to as multi-antenna in this disclosure.

MIMO technology does not depend on a single antenna path in order to receive a whole message. Instead, MIMO technology completes data by combining data fragments received via multiple antennas. The use of MIMO technology can increase data transmission rate within a cell area of a specific size or extend system coverage at a specific data transmission rate. MIMO technology can be widely used in mobile communication terminals and relay nodes. MIMO technology can overcome a limited transmission capacity encountered with the conventional single-antenna technology in mobile communication.

If a transmitter has NT transmit (Tx) antennas and a receiver has $N_R$ receive (Rx) antennas, use of a plurality of antennas at both the transmitter and the receiver increases a theoretical channel transmission capacity, compared to the use of a plurality of antennas at only one of the transmitter and the receiver. Channel transmission capacity increases in proportion to the number of antennas. Therefore, transmission rate and frequency efficiency are increased. Given a maximum transmission rate $R_o$ that may be achieved with a single antenna, the transmission rate may be increased, in theory, to the product of $R_o$ and a transmission rate increase rate $R_i$ in the case of multiple antennas, as indicated by Equation 1. $R_i$ is the smaller of $N_T$ and $N_R$.

$$R_i = \min(N_T, N_R)$$ [Equation 1]

For example, a MIMO communication system with four Tx antennas and four Rx antennas may theoretically achieve a transmission rate four times that of a single antenna system. Since the theoretical capacity increase of the MIMO wireless communication system was verified in the mid-1990s, many techniques have been actively developed to increase data transmission rate in real implementations. Some of these techniques have already been reflected in various wireless communication standards including standards for 3rd generation (3G) mobile communications, next-generation wireless local area networks, etc.

Active research up to now related to MIMO technology has focused upon a number of different aspects, including research into information theory related to MIMO communication capacity calculation in various channel environments and in multiple access environments, research into wireless channel measurement and model derivation of MIMO systems, and research into space-time signal processing technologies for improving transmission reliability and transmission rate.

Communication in a MIMO system will be described in detail through mathematical modeling. It is assumed that $N_T$ Tx antennas and $N_R$ Rx antennas are present. Regarding a transmission signal, up to $N_T$ pieces of information can be transmitted through the $N_T$ Tx antennas, as expressed as the following vector.

$$S = [S_1, S_2, \ldots, S_{N_T}]^T$$ [Equation 2]

Individual pieces of the transmission information may have $S_1, S_2, \ldots, S_{N_T}$ may have different transmit powers. If the individual transmit powers are denoted by $P_1, P_2, \ldots, P_{N_T}$, respectively, then the transmission power-controlled transmission information may be given as $$\hat{s} = [\hat{s}_1, \hat{s}_2, \ldots, \hat{s}_{N_T}]^T = [P_1 s_1, \ldots, P_{N_T} s_{N_T}]^T$$ [Equation 3]

The transmission power-controlled transmission information vector $\hat{s}$ may be expressed below, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps$$ [Equation 4]

Meanwhile, NT transmission signals $x_1, x_2, \ldots, x_{N_T}$ to be actually transmitted may be configured by multiplying the transmission power-controlled information vector $\hat{S}$ by a weight matrix W. The weight matrix W functions to appropriately distribute the transmission information to individual antennas according to transmission channel states, etc. The transmission signals $x_1, x_2, \ldots, x_{N_T}$ are represented as a vector X, which may be determined by Equation 5. Here, $W_{ij}$ denotes a weight of an i-th Tx antenna and a j-th piece of information. W is referred to as a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

Generally, the physical meaning of the rank of a channel matrix is the maximum number of different pieces of information that can be transmitted on a given channel. Therefore, the rank of a channel matrix is defined as the smaller of the number of independent rows and the number of independent columns in the channel matrix. Accordingly, the rank of the channel matrix is not larger than the number of rows or columns of the channel matrix. The rank of the channel matrix H (rank(H)) is restricted as follows.

$$\text{rank}(H) \leq \min(N_T, N_R) \quad \text{[Equation 6]}$$

A different piece of information transmitted in MIMO is referred to as a transmission stream or stream. A stream may also be called a layer. It is thus concluded that the number of transmission streams is not larger than the rank of channels, i.e. the maximum number of different pieces of transmittable information. Thus, the channel matrix H is determined by $$\text{\# of streams} \leq \text{rank}(H) \leq \min(N_T, N_R) \quad \text{[Equation 7]}$$

"# of streams" denotes the number of streams. It should be noted that one stream may be transmitted through one or more antennas.

One or more streams may be mapped to a plurality of antennas in many ways. This method may be described as follows depending on MIMO schemes. If one stream is transmitted through a plurality of antennas, this may be regarded as spatial diversity. When a plurality of streams is transmitted through a plurality of antennas, this may be spatial multiplexing. A hybrid scheme of spatial diversity and spatial multiplexing may be contemplated.

Hereinafter, channel state information (CSI) report will be described. In the current LTE standard, two transmission schemes, i.e., an open-loop MIMO scheme operating without channel information and a closed-loop MIMO scheme based on channel information exist. In particular, in the closed-loop MIMO scheme, in order to obtain multiplexing gain of a MIMO antenna, an eNB and a UE may perform beamforming based on channel state information. The eNB transmits a reference signal to the UE and indicates the UE to feed back the channel state information measured based thereon via a physical uplink control channel (PUCCH) or a physical uplink shared channel (PUSCH), in order to obtain the channel state information from the UE.

The CSI is roughly divided into a rank indicator (RI), a precoding matrix index (PMI) and a channel quality indicator (CQI). First, the RI indicates the rank information of a channel as described above and means the number of streams which may be received by the UE via the same time-frequency resources. In addition, the RI is determined by long term fading of the channel and thus is fed back to the eNB at a period longer than that of the PMI or CQI. Second, the PMI has a channel space property and indicates a precoding index of the eNB preferred by the UE based on a metric such a signal to interference plus noise ratio (SINR). Lastly, the CQI indicates the intensity of the channel and means a reception SINR obtained when the eNB uses the PMI.

Based on measurement of the radio channel, the UE calculates a preferred PMI and RI which may derive an optimal or best transfer rate when the PMI and RI are used by the BS in the current channel state and feeds the calculated PMI and RI back to the BS. Here, the CQI refers to a modulation and coding scheme for providing an acceptable packet error probability for the fed-back PMI/RI.

Acquisition of additional multi-user diversity based on MU-MIMO (multi-user MIMO) is added to a more advanced communication system such as LTE-A standard. Since interference between UEs multiplexed in an antenna domain exists in MU-MIMO, whether CSI is exact may affect interference between other multiplexed UEs as well as UEs which have reported CIS. Therefore, CSI report is required in MU-MIMO more exactly than SU-MIMO.

In this respect, in the LTE-A standard, it has been determined that final PMI is designed by being divided into W1 which is long term and/or wideband (WB) PMI and W2 which is short term and/or sub-band (SB) PMI.

As an example of a hierarchical codebook transformation scheme for configuring one final PMI from W1 and W2 may use a long-term covariance matrix of a channel as expressed by the following Equation 8.

$$W = \text{norm}(W1 W2) \quad \text{[Equation 8]}$$

In Equation 8, W2 of a short-term PMI indicates a codeword of a codebook configured to reflect short-term channel information, W denotes a codeword (in other words, precoding matrix) of a final codebook, and norm(A) indicates a matrix in which a norm of each column of a matrix A is normalized to 1.

The detailed configurations of W1 and W2 are expressed in Equation 9.

$$W1(i) = \begin{bmatrix} X_i & 0 \\ 0 & X_i \end{bmatrix}, \quad \text{[Equation 9]}$$

where $X_i$ is $Nt/2$ by $M$ matrix.

$$W2(j) = \begin{bmatrix} \overset{r \text{ columns}}{\overbrace{e_M^k \quad e_M^l \quad \cdots \quad e_M^m}} \\ \alpha_j e_M^k \quad \beta_j e_M^l \quad \cdots \quad \gamma_j e_M^m \end{bmatrix} \text{ (if rank } = r\text{),}$$

where $1 \leq k, l, m \leq M$ and $k, l, m$ are integer.

In this case, Nt is the number of Tx antennas, M is the number of columns of a matrix $X_i$, indicating that the matrix $X_i$ includes a total of M candidate column vectors. $e_M^k$, $e_M^l$, and $e_M^m$ denote k-th, l-th, and m-th column vectors of the matrix $X_i$ in which only k-th, l-th, and m-th elements among M elements are 1 and the other elements are 0, respectively. $\alpha_j$, $\beta_j$ and $\gamma_j$ are complex values each having a unit norm and indicate that, when the k-th, l-th, and m-th column vectors of the matrix $X_i$ are selected, phase rotation is applied to the column vectors. i is an integer greater than 0, denoting a PMI index indicating W1. j is an integer greater than 0, denoting a PMI index indicating W2.

In Equation 9, the codeword configurations are designed to reflect channel correlation properties generated when cross polarized antennas are used and when a space between the antennas is dense, for example, when a distance between adjacent antennas is less than a half of signal wavelength. The cross polarized antennas may be categorized into a horizontal antenna group and a vertical antenna group. Each antenna group has the characteristic of a Uniform Linear Array (ULA) antenna and the two groups are co-located.

Therefore, a correlation between antennas of each group has characteristics of the same linear phase increment and a correlation between antenna groups has characteristics of phase rotation. Consequently, since a codebook is a value obtained by quantizing a channel, it is necessary to design a codebook such that characteristics of a channel are reflected. For convenience of description, a rank-1 codeword generated by the aforementioned configurations is shown as expressed by the following Equation 10.

$$W1(i) * W2(j) = \begin{bmatrix} X_i(k) \\ \alpha_j X_i(k) \end{bmatrix}$$ [Equation 10]

In Equation 10, a codeword is expressed as a vector of $N_T$ (the number of Tx antennas)×1 and is structured with an upper vector $X_i(k)$ and a lower vector $\alpha_j X_i(k)$ which show correlation characteristics of a horizontal antenna group and a vertical antenna group, respectively. $X_i(k)$ is preferably expressed as a vector having the characteristics of linear phase increment by reflecting the characteristics of a correlation between antennas of each antenna group and may use a DFT matrix as a main example.

As described above, CSI in the LTE system includes, but is not limited to, CQI, PMI, and RI. According to transmission mode of each UE, all or some of the CQI, PMI, and RI may be transmitted. Periodic transmission of CSI is referred to as periodic reporting and transmission of CSI at the request of an eNB is referred to as aperiodic reporting.

In aperiodic reporting, a request bit included in uplink scheduling information transmitted by the eNB is transmitted to the UE. Then, the UE transmits CSI considering transmission mode thereof to the eNB through an uplink data channel (PUSCH). In periodic reporting, a period of CSI and an offset at the period are signaled in the unit of subframes by a semi-static scheme through a higher-layer signal per UE.

The UE transmits CSI considering transmission mode to the eNB through an uplink control channel (PUCCH). If uplink data simultaneously exist at a subframe in which CSI is transmitted, the CSI is transmitted through an uplink data channel (PUSCH) together with the uplink data. The eNB transmits transmission timing information suitable for each UE to the UE in consideration of a channel state of each UE and a UE distributed situation in a cell. The transmission timing information includes a period and an offset necessary for transmitting CSI and may be transmitted to each UE through an RRC message.

There are four CQI reporting modes in the LTE system. Specifically, the CQI reporting modes may be divided into modes in a WideBand (WB) CQI and modes in a SubBand (SB) CQI depending on a CQI feedback type. The CQI reporting mode may also be divided into modes in a No PMI and modes in a single PMI depending on whether a PMI is transmitted or not. Each UE is informed of information comprised of a period and an offset through RRC signaling in order to periodically report CQI.

A CSI reporting type defined in LTE release-10 is as follows.

Type 1 report supports CQI feedback for a UE at a selected subband. Type 1a report supports subband CQI and second PMI feedback. Type 2, type 2b and type 2c support wideband CQI and PMI feedback. Type 2a report supports wideband PMI feedback. Type 3report supports RI feedback. Type report supports wideband CQI. Type 5 report supports RI and wideband PMI feedback. Type 6 report supports RI and PTI (Precoding Type Indicator) feedback.

The present invention provides a method for performing signaling and specific operations required for an interference cancellation receiver in a multi-user superposition transmission (MUST) system. MUST refers to a multiple access scheme that may achieve high bandwidth efficiency by allocating a plurality of UEs to the same frequency-time resources using a preset power ratio and mitigating preset inter-user interference, basically based on the premise that a signal is transmitted to the interference cancellation receiver, in addition to time-frequency domain resource allocation of a legacy OFDMA system. MUST is under discussion as a significant candidate technology for a future 5th generation (5G) system.

Resource allocation of an eNB and interference cancellation of a UE are important techniques in the MUST system. Particularly, receivers may be classified into symbol level interference cancellation (SIC) receivers represented by a maximum likelihood (ML) receiver, and codeword level interference cancellation (CWIC) receivers represented by a minimum mea-square error (MMSE)-based linear CWIC (L-CWC) receiver and an ML-CWC receiver, depending on their interference cancellation schemes. A reception gain is different in a given environment according to each interference cancellation scheme. In general, an ML receiver and a CWIC receiver achieve high gains in proportion to the implementation complexity of a UE.

Downlink data for a plurality of UEs are transmitted using the same time and the same frequency through MUST scheme. At this time, a near UE located to be close to the eNB, having excellent geometry and a far UE located to be far away from the eNB are paired to receive a downlink service, a half or more of a total power is used for data of the far UE, and the other power is used for the near UE.

The far UE is partially interfered with data of the near UE but a transmission power carried in data of the far UE is weaker than its data power and a size of interference is weakened by high path loss, whereby the far UE may receive data without advanced IC (interference cancellation) such as SLIC (Symbol-level Interference Cancellation)/ML (Maximum likelihood)/CWIC (Codeword level interference Cancellation). On the other hand, since the near UE is affected by big interference from the far UE, the near UE attenuates interference by using IC such as SLIC/ML/CWIC and receives data.

Figure 7:
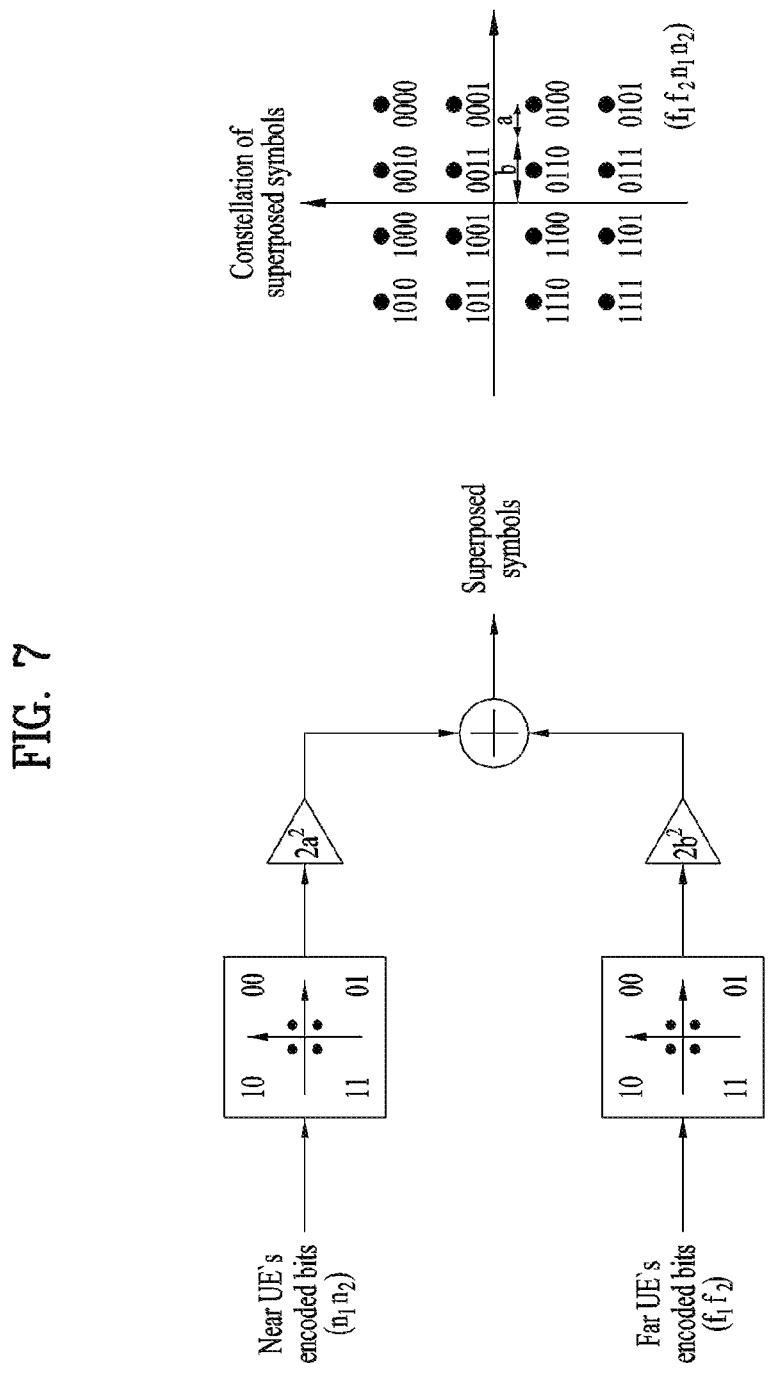
FIGS. 7 is a conceptual view illustrating an interference cancellation scheme in a multi-user superposition transmission (MUST) system.

Various transmission schemes exist in the MUST system. FIG. 7 illustrates an example of one of transmission schemes of the MUST system.

Referring to the left side of FIG. 7, information bits corresponding to data of the near UE and information bits corresponding to data of the far UE are transformed into coded bits through their respective channel coding. Afterwards, coded bits of the respective UE pass through a modulator, whereby constellation symbols of the near UE and the far UE are respectively generated. Then, after a proper power is allocated to each constellation symbol, the two constellation symbols are combined with each other to form one superposed symbol.

For example, it is assumed that a coded bit of the near UE and a coded bit of the far UE are 00 and 11, respectively. In this case, constellation symbols of each UE are generated through QPSK modulation and power allocation is performed. Afterwards, two QPSK symbols are combined with each other to generate one superposed symbol. One superposed symbol formed as above is shown at the right side of FIG. 7, and is transmitted through an eNB antenna after layer mapping and precoding.

Meanwhile, in the recent 3GPP standard, categories for the MUST system are defined as listed in Table 1 below.

TABLE 1

| | |
|---|---|
| Category 1 | Superposition transmission with adaptive power ratio on component constellations and non-Gray-mapped composite constellation |
| Category 2 | Superposition transmission with adaptive power ratio on component constellations and Gray-mapped composite constellation |
| Category 3 | Superposition transmission with label-bit assignment on composite constellation and Gray-mapped composite constellation |

In the recent LTE standardization, it has been discussed that a UE (hereinafter, referred to as MUST UE, which may be a high geometry UE or a low geometry UE), which receives data through MUST in accordance with Table 1 above, provides predetermined assistance information to efficiently cancel interference caused by data of the other UE (that is, MUST paired UE), which is transmitted by being superposed with the data of the corresponding UE, and its example is as listed in Table 2 below.

TABLE 2

The following should be considered as potential PDSCH assistance information for MUST Category 1, 2, and 3 UE.
    For MUST Category 1, 2, and 3
        (R-)ML/SLIC (available receiver type for far UE or near UE)
            Existence/processing of MUST interference (per spatial layer if same beam restriction is applied)
            Modulation order of MUST paired UE
            Transmission power allocation of its PDSCH and MUST paired UE's PDSCH (per spatial layer if different power can be allocated to each spatial layer)
            Resource allocation of MUST paired UE
            PDSCH RE mapping information of MUST paired UE (if it is different from its own PDSCH RE mapping information, e.g. PDSCH starting symbol or PDSCH RE mapping at DMRS RE)
            DMRS information of MUST paired UE (if DMRS information, is used to estimate effective channel of MUST paired UE or to derive power allocation of MUST paired UE)
            Transmission scheme of MUST paired UE (if mixed transmission schemes, e.g. transmit diversity and closed-loop spatial multiplexing)
            Precoding vector(s) of MUST paired UE
        CWIC (available receiver type for near UE)
            The above potential assistance information for ML receiver
            TBS of MUST paired UE
            HARQ information of MUST paired UE
            LBRM (Limited Buffer Rate Matching) assumption of MUST paired UE
            Parameters for descrambling and CRC checking for the PDSCH of the MUST paired user
        MMSE-IRC (available receiver type for far UE)
            Transmission power allocation of its PDSCH and MUST paired UE's PDSCH
    Additionally, the followings should be considered potential assistance information for Category 3.
        For MMSE IRC, SLIC, (R-)ML, and CWIC
            Modulation order of composite constellation
            Bit allocation information of composite constellation In the present invention, a TM (transmission mode) 4 generally considered for MUST is used for additional CSI reported by the UE for MUST. However, the suggestion of the present invention may be applied to other TMs equally or similarly.

MUST CSI, that is, MUST RI, MUST PMI, or MUST CQI means CSI additionally used by eNB for scheduling in addition to the legacy CSI (calculated under the assumption of SU (Single User)-MIMO transmission), and may be defined in various forms. For example, MUST CSI may mean the second best PMI which is the second best in view of received SINR and CQI that may be achieved by the second best PMI (during SU-MIMO reception). The eNB may enhance the probability of MUST UE scheduling by additionally acquiring the second best PMI. This may be extended such that the nth best PMI may be defined as MUST CSI.

For another example, MUST CSI may mean RI/PMI/CQI that may be achieved during PDSCH reception of the corresponding UE and cancellation or suppression of interference from a MUST paired UE when the corresponding UE is scheduled together with the MUTS paired UE. At this time, under the assumption that PMI for data of the MUST pared UE, which may be regarded as interference, is the same as PMI applied to data of the corresponding UE, RI/CQI is calculated.

In detail, the corresponding UE assumes that its data power and data power of the MUST paired UE are distributed at a specific ratio, and reports RI/PMI/CQI for its data that may be achieved when some or all of the data power of the MUST paired UE is canceled. Since this CSI is CSI calculated by the UE under the assumption of MUST, the CSI may mean CSI that may be achieved during MUST. This is compared with CSI that may be achieved during SU-MIMO transmission.

Meanwhile, if the legacy RI value is 2 or more, it is likely that MUST RI is set to be lower than the legacy RI. This is because that a tiny fraction of a power is used for data layer transmission of the legacy RI as the far UE transmitted together with the legacy RI in the MUST uses almost of all transmission powers although the legacy RI assumes that all transmission powers are used for data layer transmission thereof. For this reason, in the MUST to which 2-port CRS is configured, MUST RI may be managed by being is fixed to 1. Also, if the legacy RI value is 2, MUST PMI means a vector corresponding to the greater CQI value of two vectors of the legacy PMI, and MUST CQI means CQI that may be achieved using MUST RI (=1) and MUST PMI (during MUST). Alternatively, if the legacy RI value is 2, MUST PMI means a vector corresponding to the smaller CQI value of two vectors of the legacy PMI, and MUST CQI means CQI that may be achieved using MUST RI(=1) and MUST PMI (during MUST).

Hereinafter, MUST CSI will be described on the assumption of the second best PMI and CQI that may be achieved by the second best PMI (during SU-MIMO) in addition to the best PMI in view of received SINR. However, the suggestion of the present invention may be applied to other type MUST CSI equally or similarly. Additionally, the eNB may determine to select and report which one of various types of MUST CSIs and notify the UE of the determined MUST CSI.

Also, an operation of advanced CSI, that is, MUST CSI, based on interference cancellation between multiple UEs subjected to MUST has been described hereinafter. However, without limitation to this operation, the present invention may be used equally for advanced CSI operation based on interference cancelation between random multiple UEs which use the same resource. For example, the advanced CSI may mean the nth best PMI reported by the UE based on interference cancelation between MU-MIMO UEs, or may mean RI/PMI/CQI that may cancel or suppress interference from the MU-MIMO UEs and may be achieved during PDSCH reception thereof. For another example, the advanced CSI may mean the nth best PMI reported by the UE based on interference cancelation between other cell UEs which use the same time/frequency resource. Alternatively, the advanced CSI may mean RI/PMI/CQI that may cancel or suppress interference from the other cell UEs and may be achieved during PDSCH reception thereof.

In this respect, MUST CSI suggested in the present invention may be normalized to the advanced CSI reported by the UE having interference cancelation capability.

<First Embodiment—MUST CSI report On/Off indication>

The eNB may indicate the UE to report MUST CSI (=ON) or not to report MUST CSI (=OFF) in one or more of the followings 1) to 4).

1) First of all, the eNB indicates On/OFF by using CSI request control information on aperiodic PUSCH CSI feedback. A CSI request field of 1 bit or 2 bits exists in DCI format 0 to DCI format 4. MUST CSI feedback On/Off may be added to the CSI request field and then may be notified to the UE. In case of MUST CSI feedback On, the UE reports only MUST CSI through PUSCH without the legacy CSI.

For example, the eNB previously sets information for corresponding CSI request through RRC signaling with respect of each of four states, that is, 00, 01, 10, 11 corresponding to a 2-bit sized CSI request. In this case, the eNB may additionally determine MUST CSI feedback On/Off in four states through RRC signaling, notify the UE of the determined MUST CIS feedback On/Off and indicate the UE to perform a desired operation through a CSI request field.

In detail, state 00 indicates the legacy CSI feedback and MUST CSI Off for the serving cell, and state 01 indicates the legacy CSI feedback and MUST CSI On for the serving cell. Also, state 11 indicates MUST CSI On without the legacy CSI feedback for the serving cell. Alternatively, if signaling for MUST CSI On/Off is not added, the UE may construe it as MUST CSI off.

If the eNB indicates state 00, the UE reports the legacy CSI only through PUSCH. If the eNB indicates state 01, the UE reports MUST CSI as well as the legacy CSI through PUSCH. If the eNB indicates state 11, the UE reports MUST CSI only without the legacy CSI through PUSCH. Considering that the PUSCH has sufficient channel capacity unlike the PUCCH, state, which feeds back MUST CSI only, such as state 11, may not be required. In case of MUST CSI On, it is preferable that the legacy CSI and MUST CSI are together fed back.

2) Secondly, the eNB may indicate the UE to perform MUST CSI feedback On/Off through RRC signaling. The eNB performs blind detection for the presence of MUST CSI feedback for RRC signaling ambiguity interval until the UE receives PDSCH which includes RRC signaling and reports ACK for RRC signaling (that is, for PDSCH).

For example, the eNB which has received PUSCH CSI feedback for RRC signaling ambiguity interval assumes that the legacy CSI has been only reported, and then performs CRC check for the received CSI, whereby the eNB construes that the legacy CSI and MUST CSI have been together reported. Afterwards, the eNB performs blind detection for the presence of MUST CSI feedback by performing CRC check for the received CSI. Even in case of periodic PUCCH CSI feedback, the eNB performs blind detection between a reporting type of the legacy CSI and a reporting type in case of MUST CSI On.

3) Thirdly, if the UE receives assistance information control information (required for interference signal cancelation), for example, a range of a transmission power allocation value and set information of configurable interference data resource allocation values, from the eNB, the UE reports MUST CSI.

4) Fourthly, the UE performs on/off of MUST CSI feedback on the basis of its geometry identified through a reference signal (RS). For example, the eNB and the UE may previously define that MUST CSI feedback is 'on' if RSRP (Reference Signals Received Power) value exists within a specific range while MUST CSI feedback is 'off' if not so. The specific range may be defined as a value previously notified from the eNB to the UE through RRC signaling or a fixed value.

<Second Embodiment—Feedback system of MUST CSI>

A) Aperiodic MUST CSI Feedback

In the first embodiment, aperiodic MUST CSI feedback On/Off system has been suggested. In accordance with the first embodiment, if the UE reports MUST CSI together with the legacy CSI by adding MUST CSI to the legacy CSI, MUST CSI and the legacy CSI may follow the multiplexing system defined in the legacy multiplexing CSI report system.

That is, the legacy CQI/PMI and MUST CQI/PMI are concatenated to perform coding through one channel encoder, and the legacy RI and MUST RI are concatenated to perform coding through one channel encoder. The information coded as above is mapped into PUSCH RE in accordance with the legacy system and then reported to the eNB.

B) Periodic MUST CSI Feedback

If periodic MUST CSI feedback is performed through PUCCH, the UE may feed back the legacy CSI and MUST CSI through the following method (a) or (b).

(a) First of all, the UE determines whether to report the legacy CSI or MUST CSI, and reports the determined CSI together with M indicator. In this case, the M indicator indicates whether the corresponding CSI is the legacy CSI or MUST CSI. Alternatively, the M indicator indicates whether the legacy CSI is only reported, or MUST CSI and the legacy CSI are reported together. Even in case of aperiodic feedback, the UE may report the M indicator together with CSI, and the eNB may notify whether the CSI is the legacy CSI or MUST CSI.

As one type of criteria for determining whether the UE reports MUST CSI, the UE may consider whether there is a change through a comparison between the legacy CSI to be fed back at the current time and the legacy CSI recently reported. If there is a change, the UE feeds back the legacy CSI, and if there is no change, the UE feeds back MUST CSI instead of the legacy CSI. Alternatively, if there is no change through a comparison between the legacy CSI to be fed back at the current time and the legacy CSI recently reported, the UE feeds back the legacy CSI and MUST CSI together. Detailed description will be given with reference to the accompanying drawing.

Figure 8:
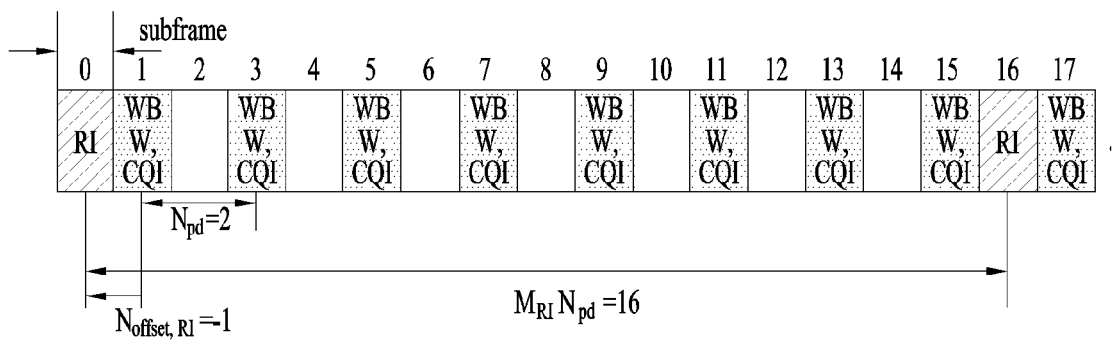
FIG. 8 is a diagram illustrating an example of the legacy PUCCH CSI feedback mode 1-1 corresponding to 2-port CRS.

FIG. 8 is a diagram illustrating an example of the legacy PUCCH CSI feedback mode 1-1 corresponding to 2-port CRS. Particularly, in FIG. 8, it is assumed that RI has a period of 16 and offset of −1, and CQI has a period of 2 and offset of 1.

In this case, in the present invention, the UE feeds back W (=PMI) and CQI together. If the legacy W/CQI recently reported is the same as the legacy W/CQI to be currently reported, the UE reports MUST W/CQI. Additionally, the UE reports a 1-bit sized M indicator together with the W/CQI, wherein the M indicator indicates whether currently reported W/CQI is the legacy W/CQI or MUST W/CQI.

Figure 9:
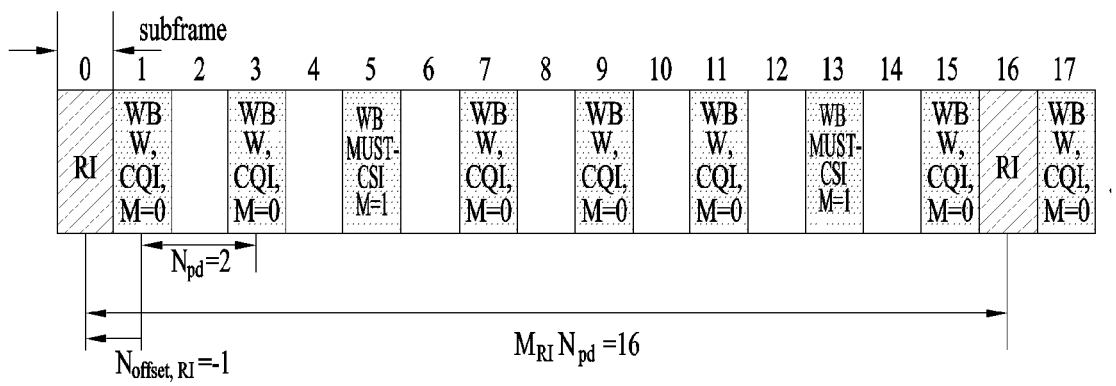
FIG. 9 is a diagram illustrating an example of a PUCCH CSI feedback mode 1-1 according to the embodiment of the present invention.

FIG. 9 is a diagram illustrating an example of a PUCCH CSI feedback mode 1-1 according to the embodiment of the present invention.

Referring to FIG. 9, the UE feeds back the legacy CSI at subframe #1 and subframe #3. Since the legacy W/CQI reported at subframe #3 is different from the legacy W/CQI reported at subframe #1, the UE feeds back the legacy CSI at subframe #3. However, since the legacy W/CQI calculated to be reported at subframe #5 is the same as the legacy W/CQI reported at subframe #3, the UE sets the M indicator to 1, and reports MUST CSI, that is, MUST PMI and MUST CQI. As the legacy W/CQI value different from the legacy W/CQI reported at subframe #3 is calculated at subframe #7, the UE reports the legacy W/CQI and sets the M indicator to 0.

The case that the legacy W/CQI currently calculated is different from the legacy W/CQI recently reported means one or two of more of the followings:

it means that the legacy W currently calculated is different from the legacy W recently reported;

it means that the legacy W currently calculated is different from the legacy W and CQI recently reported; or it means that the legacy CQI currently calculated is different from the legacy CQI recently reported.

Likewise, the case that the legacy W/CQI currently calculated is the same as the legacy W/CQI previously reported means one or two of more of the followings:

it means that the legacy W currently calculated is the same as the legacy W recently reported;

it means that the legacy W currently calculated is the same as the legacy W and CQI recently reported; or it means that the legacy CQI currently calculated is the same as the legacy CQI recently reported.

In the example of FIG. 9, CSI reported when the M indicator is 1 is replaced with MUST CSI. For example, when the M indicator is 1 in FIG. 9, MUST PMI and MUST CQI are reported. MUST PMI means the second best PMI, and MUST CQI means CQI that may achieved by the UE through this PMI. MUST PMI and MUST CQI are calculated based on the recently reported RI. If MUST RI is reported separately, MUST PMI and MUST CQI are calculated based on the recently reported MUST RI.

Otherwise, some of CSI reported when the M indicator is 1 is replaced with MUST CSI, and the other CSI may mean the legacy CSI. For example, when the M indicator is 1 in FIG. 9, MUST PMI and the legacy CQI are reported. MUST PMI is calculated based on the recently reported RI. If MUST RI is reported separately, MUST PMI is calculated based on the recently reported MUST RI. At this time, the legacy CQI is calculated based on the legacy PMI and RI, which are reported most recently, without being calculated based on MUST PMI transmitted together at the same time. Since MUST CQI is not reported, the eNB should again calculate MUST CQI by using the legacy RI, the legacy CQI and MUST PMI.

Otherwise, CSI reported when the M indicator is 1 may be construed that the legacy CSI is reported together with MUST CSI. In this case, the legacy W, the legacy CQI, MUST PMI and MUST CQI should be transmitted together at subframe at which the M indicator of FIG. 9 is reported as 1.

Additionally, different MUST CSI report systems may be managed when the legacy RI recently reported is 1 and when the legacy RI recently reported is 2. That is, if the M indicator is 1 in case of the legacy RI=1, the second best PMI and CQI that may be achieved by the second best PMI are reported, or the second best PMI and the legacy CQI are reported.

By contrast, in case of RI=2, different CSI report systems may be managed considering the followings.

The first considerations is that two PMIs may be selected from 2-port CRS in case of the legacy RI=2. Therefore, if the legacy PMI is determined, the other one automatically becomes the second best PMI, that is, MUST PMI. In this case, it is not required to report MUST PMI. Therefore, it is preferable that MUST CQI instead of MUST PMI is only reported when the M indicator is set to 1 in case of RI=2. At this time, since a payload size of PUCCH format 2 is sufficient, the legacy CQI or the legacy PMI may be reported together with MUST CQI. That is, MUST PMI is not reported at subframe of the M indicator of 1, and MUST CQI and the legacy CQI or the legacy PMI are reported. At this time, MUST CQI may mean CQI that may be achieved using the second best PMI, which assumes RI=2, (during SU-MIMO reception).

The second considerations is as follows. Although the legacy RI assumes that all transmission powers are used for data layer transmission of the legacy RI, since the far UE transmitted together with the legacy RI uses almost of the transmission powers in MUST, a tiny fraction of the powers is actually used for data layer transmission of the legacy RI and the optimal RI of the UE is smaller than or equal to the legacy RI during MUST. Therefore, in MUST to which 2-port CRS is set, MUST RI may be managed by being fixed to 1. MUST PMI is assumed as a vector corresponding to the greater legacy CQI value of two vectors of the recently reported RI=2 based legacy PMI, and MUST CQI means CQI that may be achieved using MUST RI(=1) and MUST PMI (during MUST or SU-MIMO transmission). As a result, MUST PMI is not reported at subframe of the M indicator of 1, and MUST CQI and the legacy CQI or the legacy PMI are reported.

As described above, MUST CSI reported at subframe of the M indicator of 1 in FIG. 9 may mean that MUST CSI is only reported instead of the legacy CSI, or may mean that the legacy CSI and MUST CI are reported together.

Although the description of FIG. 9 is based on PMI/CQI, the description may be applied to RI in the same manner. That is, if the legacy RI to be reported is the same as RI recently reported, the UE may report MUST RI instead of the legacy RI. Also, the presence of MUST RI may be reported together with the M indicator. If the M indicator is 1 during RI report, it is defined that MUST RI is only reported instead of the legacy RI, or the legacy RI and MUST RI are reported together.

Figure 10:
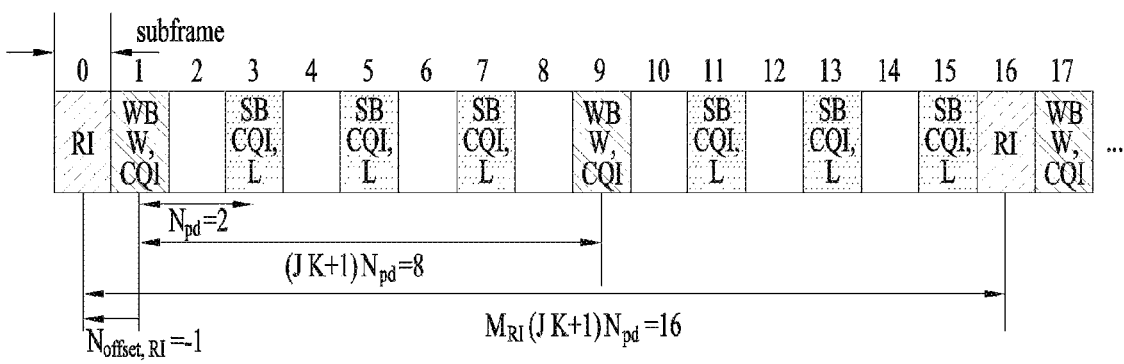
FIG. 10 is a diagram illustrating an example of the legacy PUCCH CSI feedback mode 2-1 corresponding to 2-port CRS.

FIG. 10 is a diagram illustrating an example of the legacy PUCCH CSI feedback mode 2-1 corresponding to 2-port CRS. Particularly, in FIG. 10, it is assumed that RI has a period of 16 and offset of −1, and CQI has a period of 2 and offset of 1. In FIG. 10, as J*K value is set to 3, W is reported at a period of 4 times of SB CQI period.

Figure 11:
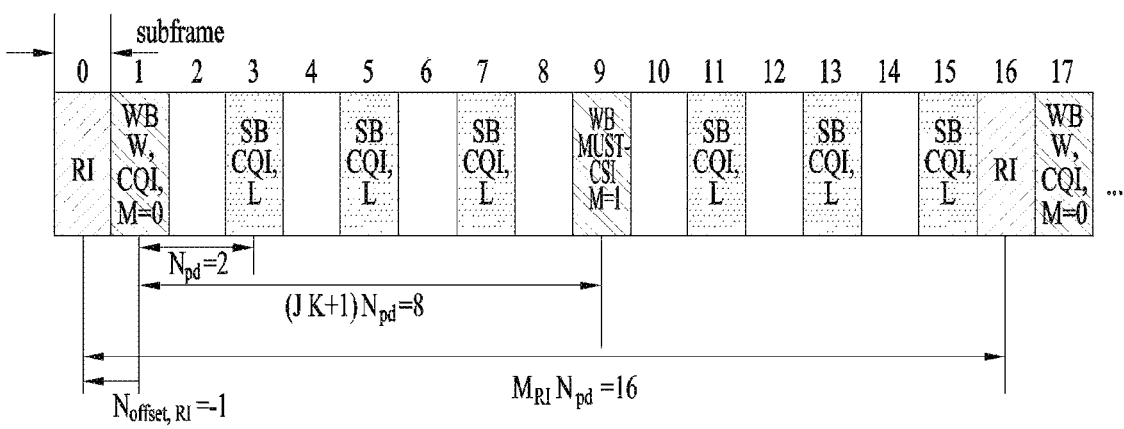
FIG. 11 is a diagram illustrating an example of a PUCCH CSI feedback mode 2-1 according to the embodiment of the present invention.

If the present invention is applied to FIG. 10, the UE performs CSI feedback as shown in FIG. 11. FIG. 11 is a diagram illustrating an example of a PUCCH CSI feedback mode 2-1 according to the embodiment of the present invention.

Referring to FIG. 11, the UE sets the M indicator to 0 at subframe #1 and reports the legacy W/CQI. Afterwards, since the legacy W/CQI calculated to be reported at subframe #9 is the same as the legacy W/CQI reported at subframe 1, the UE sets the M indicator to 1 and reports MUST CSI. Although the UE always reports the legacy SB CQI with respect SB CQI, the UE selects and reports the legacy CSI and MUST CSI with respect to WB(wideband) CSI. The legacy SB CQI is calculated based on the legacy PMI and the legacy RI, which are reported most recently.

(b) The eNB notifies the UE of a new period (or offset) for reporting MUST CSI with respect to PUCCH CSI feedback chain, and the UE reports MUST CSI at the corresponding period.

Figure 12:
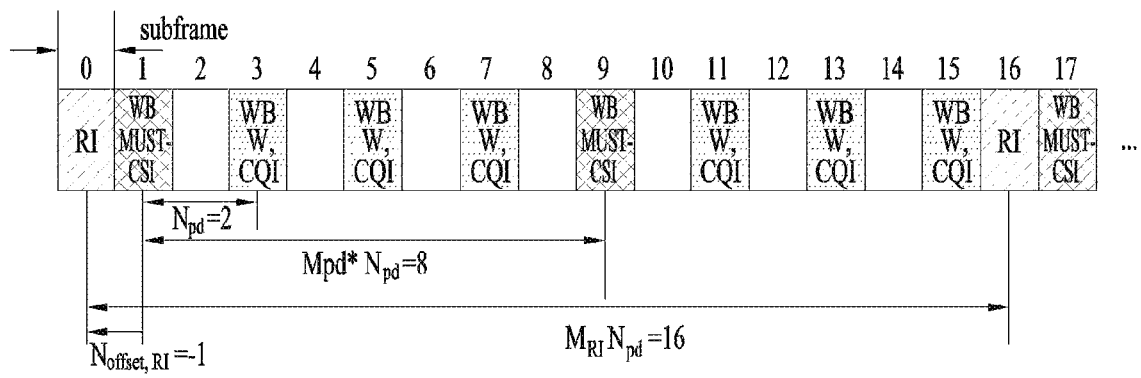
FIG. 12 is a diagram illustrating an example that a new period and offset through which MUST CSI will be reported in a PUCCH CSI feedback mode 1-1 in accordance with the embodiment of the present invention.

FIG. 12 is a diagram illustrating an example that a new period and offset through which MUST CSI will be reported in a PUCCH CSI feedback mode 1-1 in accordance with the embodiment of the present invention.

Referring to FIG. 12, the eNB sets a new period Mpd through which MUST CSI will be reported, that is, 4 and offset Moffset, that is, 0 in PUCCH CSI feedback mode 1-1. At this time, since Moffset is a value based on a report offset of CQI, Moffset=0 means the same offset as the report offset of CQI.

A period of MUST CSI is set by a product of Mpd and Npd, and Moffset may be restricted to be set to a multiple of Npd or a value between 0 and Npd−1. Alternatively, Moffset may always be fixed to a specific value such as 0. Also, a higher priority may be given to MUST CSI than the legacy W/CQI such that MUST CSI may be reported at subframe #1, subframe #9 and subframe #17 at which reports of the legacy W/CQI and MUST CSI collide with each other. Therefore, the UE reports MUST CSI at subframe #1, subframe #9 and subframe #17.

In more detail, the MUST CSI value is the same as MUST CSI reported when the M indicator suggested in FIG. 9 is 1. For example, at subframe #1, subframe #9 and subframe #17, the legacy W, the legacy CQI, MUST PMI, and MUST CQI are reported at one time. In this case, to reduce a payload size, MUST CQI may be defined as delta CQI or differential CQI indicating an index difference compared with the legacy CQI. In case of RI=2, MUST PMI may be omitted. If Mpd is 1 and Moffset is 0, a report period of MUST CSI is always overlapped with a report period of the legacy CSI (that is, the legacy WB W+the legacy WB CQI). However, since MUST CSI has a priority, MUST CSI newly defined instead of the legacy CQI is reported. The newly defined MUST CSI means CSI reported when the M indicator is 1, and may be comprised of MUST CSI only, or may mean CSI reported when MUST CSI and the legacy CSI are reported together. The eNB may manage Mpd by always fixing the value of Mpd to 1.

Figure 13:
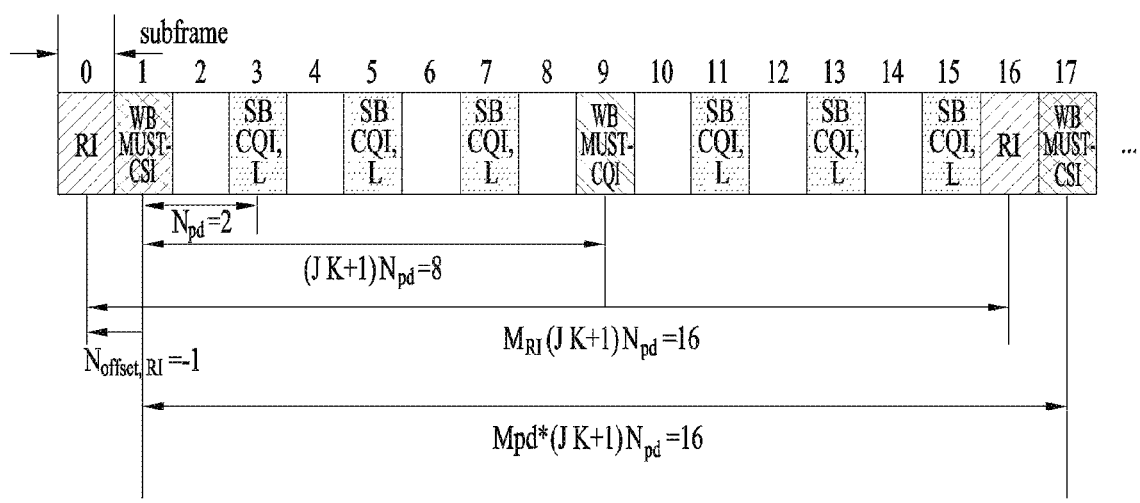
FIG. 13 is a diagram illustrating an example that a new period and offset through which MUST CSI will be reported in a PUCCH CSI feedback mode 2-1 in accordance with the embodiment of the present invention.

FIG. 13 is a diagram illustrating an example that a new period and offset through which MUST CSI will be reported in a PUCCH CSI feedback mode 2-1 in accordance with the embodiment of the present invention.

Referring to FIG. 13, the eNB sets a new period Mpd through which MUST CSI will be reported, that is, 2 and offset Moffset, that is, 0 in PUCCH CSI feedback mode 2-1. At this time, since Moffset is a value based on a report offset of CQI, Moffset=0 means the same offset as the report offset of CQI.

In more detail, a period of MUST CSI is set by a product of Mpd and (JK+1)*Npd, and Moffset may be restricted to be set to a multiple of (JK+1)*Npd or a value between 0 and Npd−1. Alternatively, Moffset is always fixed to a specific value such as 0. Also, a higher priority is given to MUST CSI than the legacy W/CQI such that MUST CSI may be reported at subframe # and subframe #17 at which reports of the legacy W/CQI and MUST CSI collide with each other. Therefore, the UE reports MUST CSI at subframe #1 and subframe #17.

The UE reports MUST CSI at subframe # and subframe #17 at which the reports collide with each other, and this MUST CSI value is the same as MUST CSI reported when the M indicator suggested in FIG. 9 is 1. For example, at subframe # and subframe #17, the legacy W, the legacy CQI, MUST PMI, and MUST CQI are reported at one time. In this case, to reduce a payload size, MUST CQI may be defined as delta CQI indicating an index difference compared with the legacy CQI. In case of RI=2, MUST PMI may be omitted.

If Mpd is 1 and Moffset is 0, a report period of MUST CSI is always overlapped with a report period of the legacy CSI (that is, the legacy WB W+the legacy WB CQI). However, since MUST CSI has a priority, MUST CSI newly defined instead of the legacy CQI is reported. The newly defined MUST CSI means CSI reported when the M indicator is 1, and may be comprised of MUST CSI only, or may mean CSI reported when MUST CSI and the legacy CSI are reported together. The eNB may manage Mpd by always fixing the value of Mpd to 1.

Although the description of FIGS. 12 and 13 is based on PMI/CQI, the description may be applied to RI in the same manner. That is, in addition to the legacy RI period and offset, a period and offset for MUST RI may be set. The period and offset for MUST RI may be restricted to a multiple of the legacy RI period, and the offset may be fixed to 0 based on the reporting timing of the legacy RI. In this case, although the MUST RI reporting timing always collides with the legacy RI reporting timing, a higher priority is given to the MUST RI report. At the MUST RI reporting timing, the UE reports MUST RI only instead of the legacy RI, or reports both the legacy RI and MUST RI. The eNB may always set the period of MUST RI equal to that of the legacy RI, and may always fix offset of MUST RI to 0.

In FIGS. 11 and 13, the legacy SB CQI and L information may also be replaced with MUST CSI (that is, SB MUST CQI and L), or may be transmitted together with MUST CSI. To this end, the M indicator may be reported together with the above information, or separate report period and offset may be set in the same manner as that period and offset are added for WB MUST CSI information. If MUST CSI and the legacy SB CSI are transmitted together, L information may be shared by MUST CSI and the legacy SB CQI. That is, the legacy SB CQI and MUST CSI are calculated and reported for the same SB.

<Third Embodiment—Priority of MUST CR>

In case of periodic CSI feedback through PUCCH, if two or more CSI reporting types are set to be reported at the same time, this is referred to as CSI collision. At this time, the UE applies a priority between previously defined reporting types and selectively reports a reporting type having a high priority. If a reporting type of the MUST CSI is added, a priority should be defined newly during CSI collision.

First of all, a reporting type which includes MUST CSI may be defined to have the same priority as that of a reporting type of the legacy CSI. For example, a reporting type which includes MUST RI is set to have the same priority as that of a reporting type which includes the legacy RI, and a reporting type which includes MUST CQI/PMI without including MUST RI has the same priority as that of a reporting type which includes CQI/PMI without including the legacy RI.

Otherwise, a reporting type which includes MUST CSI only may be defined to have a priority lower than the other reporting type. For example, when the M indicator is 1 in FIG. 9, a reporting type may include M indicator, MUST PMI, and MUST CQI. This reporting type has a priority lower than the reporting type which includes the legacy CSI, that is, the M indicator is 0, the legacy PMI, the legacy CQI or the legacy reporting type. The eNB may perform MU-MIMO scheduling even after receiving the legacy CSI. In this case, the eNB may perform scheduling by properly compensating for the legacy CSI and re-calculating CSI for MU-MIMO. Alternatively, the eNB may perform MU-MIMO scheduling even after receiving the legacy CSI. In this case, the eNB may perform scheduling by properly compensating for the legacy CSI and re-calculating MUST CSI. In this way, since the eNB may properly re-calculate CSI even though the legacy CSI is reported, it is preferable that the UE reports the legacy CSI when collision in CSI report occurs.

Otherwise, a reporting type which includes MUST CSI only may be defined to have a priority higher than the other reporting type. As MUST CSI has a priority higher than the legacy CSI, the eNB which has received MUST CSI may perform more aggressive scheduling. Although the eNB may calculate MUST CSI from the legacy CSI, since exactness of MUST CSI reported by the UE is generally more excellent than MUST CSI calculated by the eNB from the legacy CSI, if the eNB actively performs MUST scheduling, it is favorable that the UE first reports MUST CSI in increasing cell transmission capacity.

A reporting type redefined to additionally report MUST CSI as well as the legacy CSI defined in the legacy reporting type may be defined to have a priority higher than the reporting type which includes the legacy CSI only. For example, if a reporting type for reporting the legacy RI and MUST RI together is defined, the reporting type has a priority higher than the reporting type (that is, reporting types 3, 5 and 6) for reporting the legacy RI. Also, if a reporting type for reporting the legacy PMI/CQI and MUST/PMI/CQI together is defined, the reporting type has a priority higher than the reporting type (that is, reporting type 1, reporting type 1a, reporting type 2, reporting type 2a, reporting type 2b, reporting type 2c, or reporting type 4) for reporting the legacy PMI/CQI.

Additionally, in the above suggestion related to priority, the reporting type which includes RI regardless of the legacy CSI or MUST CSI may be defined to have a priority higher than the reporting type which does not include RI.

<Fourth Embodiment—definition of reporting type for MUST CSI>

Meanwhile, it is required to introduce a new reporting type for the aforementioned MUST CSI. The new reporting type may be transmitted together with the M indicator. Hereinafter, as such an example, reporting type A to reporting type R will be suggested.

Reporting type A: reporting type which includes WB MUST PMI and WB MUST CQI.

In the reporting type A, MUST PMI is the second best PMI calculated by the UE under the assumption of SU MIMO transmission, and MUST CQI is CQI calculated under the assumption of SU MIMO transmission based on PMI and recently reported RI (or recently reported MUST RI if MUST RI exists separately).

Reporting type B: reporting type which includes WB MUST PMI and WB legacy CQI.

In the reporting type B, MUST PMI is the second best PMI calculated by the UE under the assumption of SU MIMO transmission, and the legacy CQI is CQI calculated under the assumption of SU MIMO transmission based on the recently reported legacy PMI and the legacy RI.

Reporting type C: reporting type which includes WB MUST PMI, WB MUST CQI WB, WB legacy PMI, and WB legacy CQI.

In the reporting type C, MUST PMI and MUST CQI are the same as the reporting type A. To reduce a payload size, MUST PMI may be restricted to be selected within a specific subset within a full codebook, and MUST CQI may be defined as delta CQI that means an index difference based on the legacy CQI.

If the number of the legacy CQI for two codewords is 2, delta CQI may be defined for each codeword but may be defined as one delta CQI commonly applied to two codewords. For example, when values of the legacy CQI 1 and 2 are 10 and 12, respectively, a delta CQI value commonly applied to two codewords is 1. In this case, MUST CQI 1 and 2 are defined as 10+1 and 12+1.

Reporting type D: reporting type which includes MUST RI.

In the reporting type D, CRI, PTI, MUST W1, etc. may additionally be reported together.

Reporting type E: reporting type which includes MUST RI+the legacy RI.

In the reporting type E, CRI, PTI, W1, etc. may additionally be reported together.

Reporting type F: reporting type which includes WB MUST CQI and WB legacy CQI.

Reporting type G: reporting type which includes WB MUST CQI only.

Reporting type H: reporting type which includes WB MUST PMI only.

Reporting type I: reporting type which includes WB MUST CQI, WB legacy PMI and WB legacy CQI.

Reporting type J: reporting type which includes WB MUST PMI, WB legacy PMI and WB legacy CQI.

Reporting type K: reporting type which includes WB MUST PMI, WB MUST CQI and WB legacy CQI.

Reporting type L: reporting type which includes WB MUST PMI, WB MUST CQI and WB legacy PMI.

Reporting type M: reporting type which includes WB MUST PMI, and WB legacy PMI.

Reporting type N: reporting type which includes WB MUST CQI and WB legacy PMI.

Reporting type O: reporting type which includes WB MUST PMI.

Reporting type P: reporting type which includes WB MUST CQI.

Reporting type Q: reporting type which includes SB MUST CQI.

Reporting type R: reporting type which includes SB MUST CQI, SB legacy CQI, and L-bit indicator indicating a selected subband.

At subframe at which the MUST CSI is reported, one type of the reporting type A to the reporting type R defined as above may be reported. If MUST RI is reported separately from the legacy RI or MUST RI is defined by being fixed to a specific value, for example, if MUST RI value is fixed to 1, the MUST PMI and the MUST CQI should be calculated based on the recently reported MUST RI not the recently reported legacy RI or the fixed MUST RI value.

Figure 14:
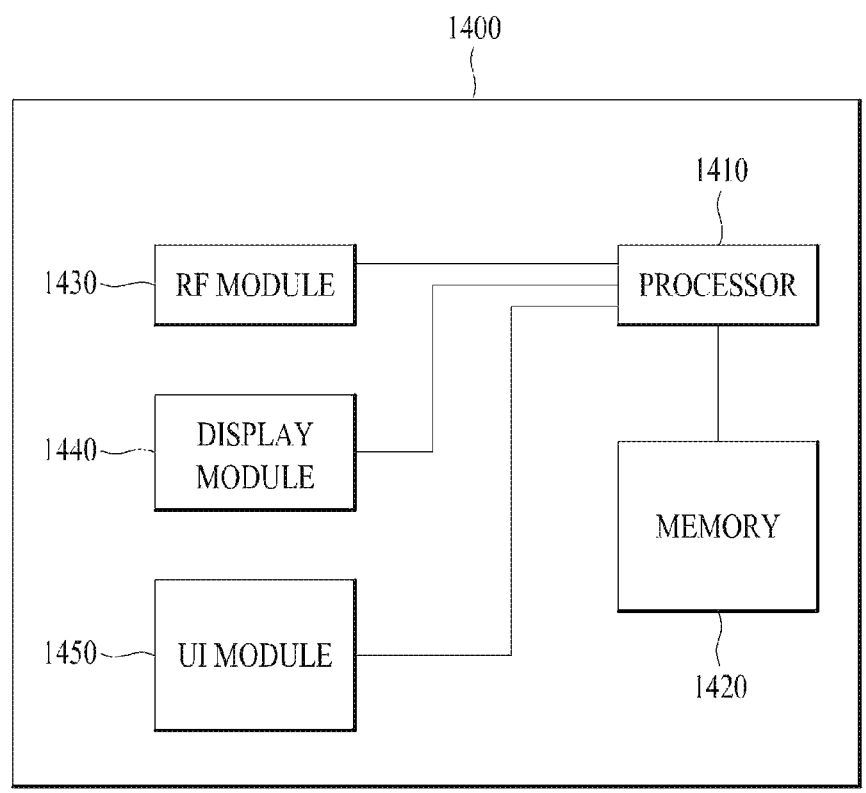
FIG. 14 is a block diagram of a communication apparatus according to an embodiment of the present invention.

FIG. 14 is a block diagram of a communication apparatus according to an embodiment of the present invention.

Referring to FIG. 14, a communication apparatus 1400 includes a processor 1410, a memory 1420, an RF module 1430, a display module 1440, and a User Interface (UI) module 1450.

The communication apparatus 1400 is shown as having the configuration illustrated in FIG. 14, for the convenience of description. Some modules may be added to or omitted from the communication apparatus 1400. In addition, a module of the communication apparatus 1400 may be divided into more modules. The processor 1410 is configured to perform operations according to the embodiments of the present invention described before with reference to the drawings. Specifically, for detailed operations of the processor 1410, the descriptions of FIGS. 1 to 13 may be referred to.

The memory 1420 is connected to the processor 1410 and stores an Operating System (OS), applications, program codes, data, etc. The RF module 1430, which is connected to the processor 1410, upconverts a baseband signal to an RF signal or downconverts an RF signal to a baseband signal. For this purpose, the RF module 1430 performs digital-to-analog conversion, amplification, filtering, and frequency upconversion or performs these processes reversely. The display module 1440 is connected to the processor 1410 and displays various types of information. The display module 1440 may be configured as, not limited to, a known component such as a Liquid Crystal Display (LCD), a Light Emitting Diode (LED) display, and an Organic Light Emitting Diode (OLED) display. The UI module 1450 is connected to the processor 1410 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Although the method for reporting channel state information for MUST (Multi-User Superposition Transmission) in a wireless communication system and the device therefor have been described based on the 3GPP LTE system, the method and the device are applicable to various wireless communication systems in addition to the 3GPP LTE system.

The invention claimed is:

1. A method for reporting channel state information (CSI) from a user equipment (UE) to a base station in a wireless communication system, the method comprising:
    calculating first CSI;
    comparing the calculated first CSI with CSI which has been most recently reported; and
    when the calculated first CSI is not the same as the CSI which has been most recently reported, reporting the first CSI to the base station,
    wherein, when the calculated first CSI is the same as the CSI which has been most recently reported, the method further comprises:
    calculating second CSI by canceling data of a paired UE scheduled together with the UE, on the basis of the assumption that a precoding matrix index (PMI) for the data of the paired UE is the same as a PMI for data of the UE; and
    reporting second CSI to the base station, and
    wherein the second CSI includes an indicator indicating that the second CSI is calculated by canceling the data of the paired UE scheduled together with the UE.

2. The method according to claim 1, wherein comparing the calculated first CSI comprises comparing the calculated first CSI with the CSI which has been most recently reported when a strength of a reference signal received from the base station is a threshold value or more.

3. The method according to claim 1, wherein the second CSI includes the PMI and the CQI when a rank indicator of the CSI which has been most recently reported is 1.

4. The method according to claim 1, wherein the second CSI includes only the CQI when a rank indicator of the CSI which has been most recently reported is 2.

5. A user equipment (UE) in a wireless communication system, the UE comprising:
    a radio frequency (RF) module; and
    a processor configured to:
    calculate first channel state information (CSI),
    compare the calculated first CSI with CSI which has been most recently reported, and
    report the first CSI to a base station when the calculated first CSI is not the same as the CSI which has been most recently reported, wherein, when the calculated first CSI is the same as the CSI which has been most recently reported, the processor is further configured to:

calculate second CSI by canceling data of a paired UE scheduled together with the UE, on the basis of the assumption that a precoding matrix index (PMI) for the data of the paired UE is the same as a PMI for data of the UE, and report second CSI to the base station, and wherein the second CSI includes an indicator indicating that the second CSI is calculated by canceling the data of the paired UE scheduled together with the UE.

6. The UE according to claim 5, wherein the processor compares the calculated first CSI with the CSI which has been most recently reported when a strength of a reference signal received from the base station is a threshold value or more.

7. The UE according to claim 5, wherein the second CSI includes the PMI and the CQI when a rank indicator of the CSI which has been most recently reported is 1.

8. The UE according to claim 5, wherein the second CSI includes only the CQI when a rank indicator of the CSI which has been most recently reported is 2.

* * * * *